United States Patent
Eun

(10) Patent No.: US 10,491,773 B2
(45) Date of Patent: Nov. 26, 2019

(54) INFORMATION PROCESSING APPARATUS, METHOD OF CANCELING PROHIBITION, AND NON-TRANSITORY RECORDING MEDIUM

(71) Applicant: Jongsook Eun, Tokyo (JP)

(72) Inventor: Jongsook Eun, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/008,308

(22) Filed: Jun. 14, 2018

(65) Prior Publication Data

US 2018/0376022 A1    Dec. 27, 2018

(30) Foreign Application Priority Data

Jun. 21, 2017 (JP) ................. 2017-121617

(51) Int. Cl.
| | |
|---|---|
| *G06F 3/12* | (2006.01) |
| *G06K 15/02* | (2006.01) |
| *G06F 1/3206* | (2019.01) |
| *H04N 1/00* | (2006.01) |
| *H04N 1/44* | (2006.01) |

(52) U.S. Cl.
CPC ....... *H04N 1/00896* (2013.01); *G06F 1/3206* (2013.01); *G06F 3/1221* (2013.01); *G06F 3/1229* (2013.01); *H04N 1/4433* (2013.01)

(58) Field of Classification Search
None
See application file for complete search history.

(56) References Cited

U.S. PATENT DOCUMENTS

| | | | | |
|---|---|---|---|---|
| 6,499,031 | B1 * | 12/2002 | Hopmann | G06F 21/6218 |
| 7,472,237 | B1 * | 12/2008 | Herbst | G06F 9/5027 711/152 |
| 9,229,522 | B1 * | 1/2016 | Tian | G06F 9/4418 |
| 9,501,382 | B2 | 11/2016 | Hu et al. | |
| 2002/0135612 | A1 * | 9/2002 | Royer | G06F 21/41 715/741 |
| 2005/0226641 | A1 | 10/2005 | Ando et al. | |
| 2007/0130255 | A1 * | 6/2007 | Wolovitz | H04L 51/38 709/204 |
| 2007/0198980 | A1 * | 8/2007 | Kwon | G06F 9/485 718/100 |

(Continued)

FOREIGN PATENT DOCUMENTS

| | | |
|---|---|---|
| CN | 106502687 A | 3/2017 |
| JP | 2004-112718 | 4/2004 |

(Continued)

OTHER PUBLICATIONS

Extended European Search Report dated Nov. 20, 2018 in Patent Application No. 18178295.4, 8 pages.

*Primary Examiner* — Beniyam Menberu
(74) *Attorney, Agent, or Firm* — Oblon, McClelland, Maier & Neustadt, L.L.P.

(57) ABSTRACT

An information processing apparatus includes circuitry to check whether a program is active at plural timings. The program is previously terminated while keeping prohibition of at least one operation of the information processing apparatus. The circuitry cancels the prohibition of the at least one operation of the information processing apparatus when the program remains inactive for a given period of time.

15 Claims, 10 Drawing Sheets

(56) References Cited

U.S. PATENT DOCUMENTS

| | | | |
|---|---|---|---|
| 2008/0168448 A1* | 7/2008 | Lewis | G06F 9/524 718/102 |
| 2008/0184238 A1* | 7/2008 | Ruemmler | G06F 9/485 718/102 |
| 2008/0195688 A1 | 8/2008 | Watanabe | |
| 2008/0235434 A1 | 9/2008 | Eun et al. | |
| 2009/0037927 A1* | 2/2009 | Sangili | G06F 9/461 718/108 |
| 2009/0217276 A1* | 8/2009 | Brenner | G06F 9/4856 718/102 |
| 2009/0271789 A1* | 10/2009 | Babich | G06F 9/526 718/100 |
| 2010/0149574 A1 | 6/2010 | Eun et al. | |
| 2010/0205449 A1 | 8/2010 | Eun et al. | |
| 2010/0318852 A1* | 12/2010 | Zheng | G06F 11/3664 714/37 |
| 2011/0047549 A1* | 2/2011 | Rogers | G06F 9/50 718/100 |
| 2012/0011580 A1 | 1/2012 | Eun et al. | |
| 2013/0047011 A1* | 2/2013 | Dice | G06F 9/485 713/320 |
| 2013/0247060 A1* | 9/2013 | Makljenovic | G06F 9/526 718/104 |
| 2014/0068624 A1* | 3/2014 | Fuller | G06F 9/5011 718/104 |
| 2014/0245414 A1 | 8/2014 | Eun | |
| 2014/0380283 A1* | 12/2014 | Hu | G06F 11/3604 717/132 |
| 2015/0234442 A1* | 8/2015 | Emami | H04W 52/0251 713/323 |
| 2016/0217084 A1 | 7/2016 | Eun | |
| 2016/0275274 A1 | 9/2016 | Eun | |
| 2017/0052587 A1 | 2/2017 | Eun | |
| 2017/0220779 A1* | 8/2017 | Minagawa | G06F 21/105 |
| 2018/0046791 A1 | 2/2018 | Eun | |
| 2018/0095783 A1* | 4/2018 | Lillibridge | G06F 9/3009 |
| 2018/0103170 A1 | 4/2018 | Eun | |

FOREIGN PATENT DOCUMENTS

| | | |
|---|---|---|
| JP | 2006-222569 | 8/2006 |
| JP | 2007-152824 | 6/2007 |
| JP | 2008-072391 | 3/2008 |
| JP | 2009-029102 | 2/2009 |
| JP | 2012-034203 | 2/2012 |
| WO | WO 2015/126647 A1 | 8/2015 |

* cited by examiner

FIG. 7

```
<manifest xmlns:aaa="http://schemas.aaa.com/apk/res/aaa"
    package="jp.co.rrr.xxx.app1"  }d1
    aaa:versionCode="1"
    aaa:versionName="1.00.00" >

<uses-permission aaa:name="aaa.permission.INTERNET"/>

<application
        aaa:allowBackup="true"
        aaa:icon="@drawable/app_launcher"
        aaa:label="@string/app_name"
        aaa:theme="@style/AppTheme" >
        <meta-data aaa:name="productId" aaa:value="874520576"/>
    </application>

<apk_app_info>
        <check_interval>30</check_interval>   }d2
    </apk_app_info>
</manifest>
```

FIG. 8

(1)
■ LOCKING STATUS OF ENTIRE SYSTEM
- POWER MODE TRANSITION : LOCKED
- OFFLINE TRANSITION : UNLOCKED
- POWER-OFF : UNLOCKED
- DISPLAY-OFF OF OPERATION UNIT : UNLOCKED
- SYSTEM RESET : UNLOCKED
- DISPLAY MODE TRANSITION OF OPERATION UNIT : UNLOCKED
- LOGOUT : LOCKED (2)
■ LOCKING STATUS OF ENTIRE SYSTEM
- POWER MODE TRANSITION : LOCKED (xxxxxxxxxxxxxxxxxx2, xxxxxxxxxxxxxxxxxx3)
- OFFLINE TRANSITION : UNLOCKED
- POWER-OFF : UNLOCKED
- DISPLAY-OFF OF OPERATION UNIT : UNLOCKED
- SYSTEM RESET : UNLOCKED
- DISPLAY MODE TRANSITION OF OPERATION UNIT : UNLOCKED
- LOGOUT : LOCKED (xxxxxxxxxxxxxxxxxx3)

FIG. 9

■ APPLICATION LIST

- APPLICATION IDENTIFIER : xxxxxxxxxxxxxxxxx1
- OPERATIONAL STATUS: ACTIVE

- APPLICATION IDENTIFIER : xxxxxxxxxxxxxxxxx2
- OOPERATIONAL STATUS: INACTIVE

- APPLICATION IDENTIFIER : xxxxxxxxxxxxxxxxx3
- OPERATIONAL STATUS: INACTIVE

FIG. 10

■ APPLICATION MANAGEMENT INFORMATION

| | |
|---|---|
| · APPLICATION IDENTIFIER | : xxxxxxxxxxxxxxxxx2 |
| · POWER MODE TRANSITION | : LOCKED |
| · OFFLINE TRANSITION | : UNLOCKED |
| · POWER-OFF | : UNLOCKED |
| · DISPLAY-OFF OF OPERATION UNIT | : UNLOCKED |
| · SYSTEM RESET | : UNLOCKED |
| · DISPLAY MODE TRANSITION OF OPERATION UNIT | : UNLOCKED |
| · LOGOUT | : UNLOCKED |

FIG. 11

■ UNLOCK CANDIDATE LIST

- APPLICATION IDENTIFIER: xxxxxxxxxxxxxxxxx2
- THE NUMBER OF INACTIVE DETECTION TIMES: 0

- APPLICATION IDENTIFIER: xxxxxxxxxxxxxxxxx3
- THE NUMBER OF INACTIVE DETECTION TIMES: 0

INFORMATION PROCESSING APPARATUS, METHOD OF CANCELING PROHIBITION, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2017-121617, filed on Jun. 21, 2017, in the Japan Patent Office, the entire disclosure of which is hereby incorporated by reference herein.

BACKGROUND

Technical Field

The present disclosure relates to an information processing apparatus, a method of canceling prohibition, and a non-transitory recording medium.

Related Art

Some of various apparatuses including an image forming apparatus have a plurality of operational modes. For example, an apparatus has the plurality of operation modes, such as a power-saving mode (energy-saving mode) and a non-power-saving mode (e.g., normal mode). The power-saving mode is defined as a mode in which the apparatus stops supplying a power to some or all of the hardware resources to save the power consumption.

Some apparatuses implement a transition to the power-saving mode using a program-based control. In such apparatuses, when the transition to the power-saving mode occurs at a timing that is not expected by a program, abnormality may occur to the program-based control. To avoid such abnormality, some apparatuses have a mechanism of enabling any programs to apply a lock to prevent the apparatuses from transitioning to the power saving mode. Such apparatuses transitions to the power-saving mode under condition where no program applies the lock mode.

However, there may be a case where a program, which applies a lock to the apparatus, is terminated without unlocking the lock due to an abnormal termination, a forced termination caused by inconvenience occurring in a system, or a bug related to implementation, for example. If such a lock is left, the transitioning to the power-saving state is unnecessarily prohibited, resulting in reduction of power saving efficiency.

To cope with this situation, there is an apparatus that has a mechanism of checking whether a program that applies a lock is active or not (hereinafter, referred to as "periodical check") and forcibly canceling, or unlocking, a lock if there is such a lock (hereinafter, referred to as a "lock-being-continued mode").

SUMMARY

An example of the embodiments includes an information processing apparatus including circuitry. The circuitry checks whether a program is active at plural timings. The program is previously terminated while keeping prohibition of at least one operation of the information processing apparatus. The circuitry cancels the prohibition of the at least one operation of the information processing apparatus when the program remains inactive for a given period of time.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 7 illustrates an example of configuration information of an application according to the embedment;

FIG. 8 illustrate examples of lock mode information according to the embodiment;

FIG. 9 illustrates an example of an application list according to the embodiment;

FIG. 10 illustrates an example of application management information according to the embodiment;

FIG. 11 illustrates an example of an unlock candidate list according to the embodiment.

Figure 1:
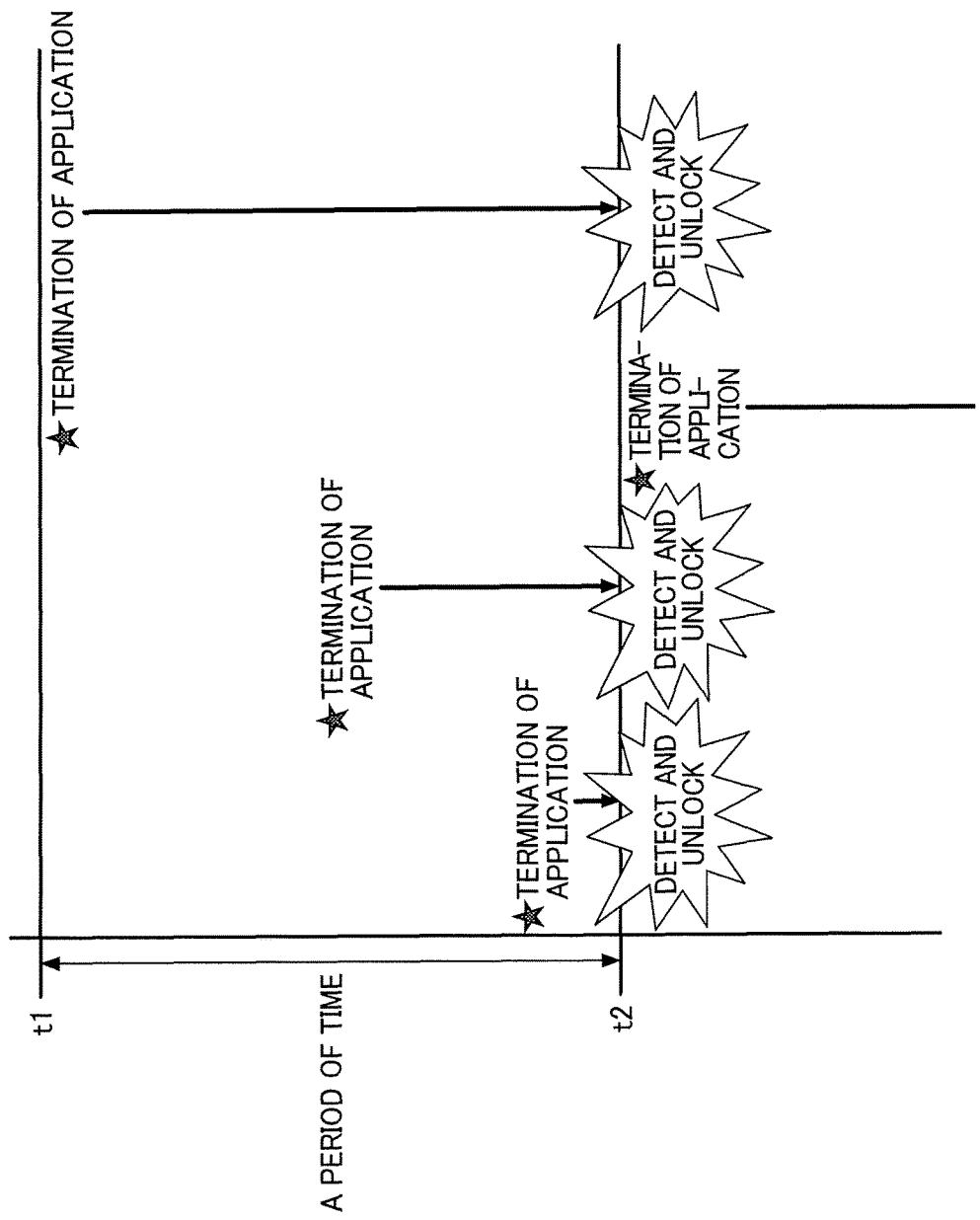
FIG. 1 illustrates a process of cancelling a lock-being-continued mode applied by application periodically in a related art.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

Figure 2:
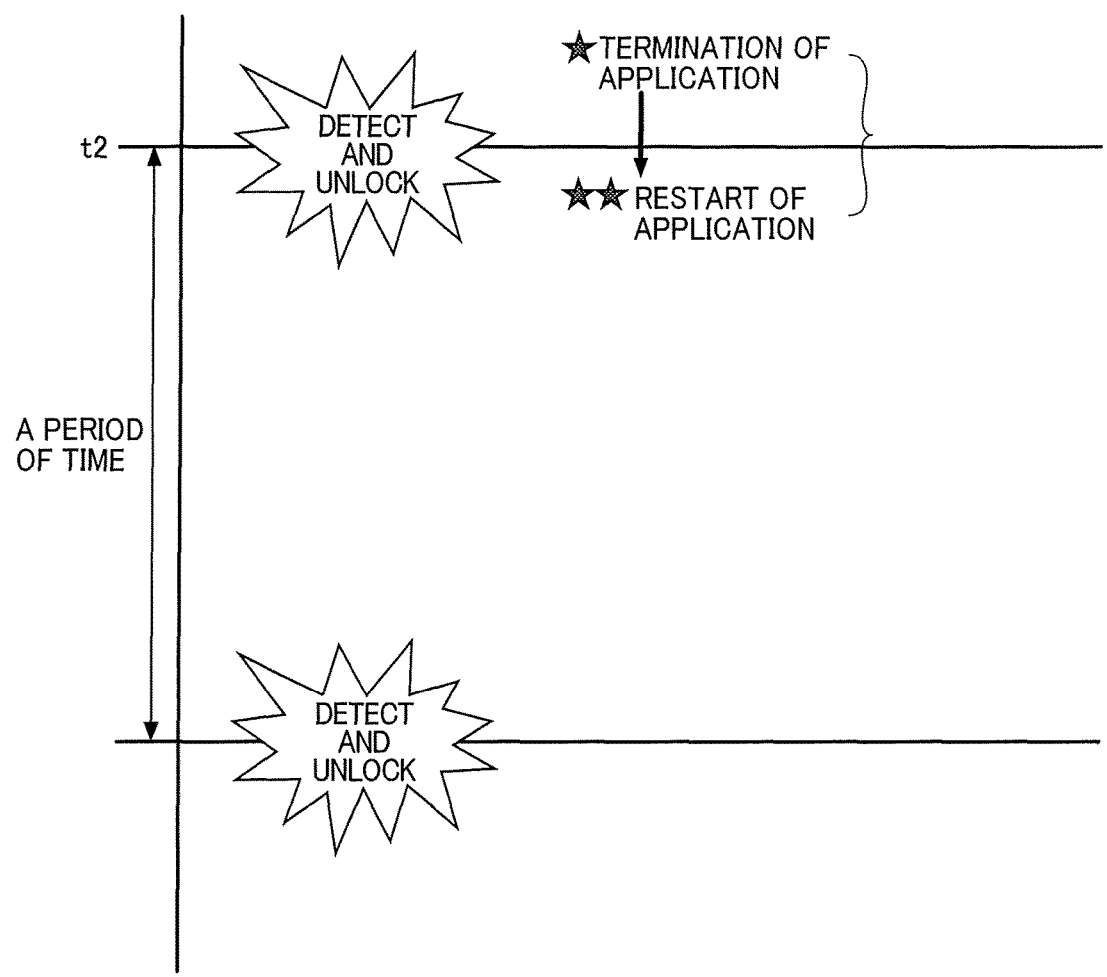
FIG. 2 schematically illustrates a process of cancelling the lock mode applied by application when a resuming process is performed in a related art.

A description is given of a related art with reference to FIG. 1 and FIG. 2. FIG. 1 schematically illustrates a process of cancelling the lock-being-continued mode applied by application programs periodically. In FIG. 1, the vertical axis represents the time line, and the time passes from the top to the bottom. The horizontal axis represents each application program previously applied the lock mode. Hereinafter, each application program is referred to as an "application." When the periodical check is performed at a periodical check time point t1 and a periodical check time point t2, and each application is terminated after the periodical check time point t1, the lock mode applied by each application is cancelled (unlocked) at the periodical check time point t2.

Some of the applications that are forcibly terminated due to inconvenience occurring in a system are recoverable to be in an active status by automatically performing a resuming process to continue a specific operation that was being performed before the forced termination of the application. For example, an image forming apparatus is installed with a facsimile application to transmit and receive facsimile (FAX) data. If the facsimile application was forcibly terminated while the image forming apparatus receiving the FAX data, the facsimile application is automatically resumed to be in the active mode to receive the FAX data that was not received by the forced termination.

However, when such a resuming process of the program and the periodical check are performed at substantially the same time, the application is determined as being in an inactive status by the periodical check and the lock applied by the application is forcibly canceled (unlocked).

FIG. 2 schematically illustrates a process of cancelling the lock mode applied by application when the resuming process is performed. In an example case of FIG. 2, an application is forcibly terminated right before the periodical check time point t2, and then the application is resumed right after the periodic check time point t2 by performing the resuming process after the forced termination. In the above-described case, the lock mode applied by the application is canceled at the periodical check time point t2.

Then, the apparatus may shift to the power-saving mode at a timing that is not convenient for the application during or after the resuming process of the application, causing the application unable to continue the specific operation that the application is designed to complete.

In the above described configuration, the transition or shift to the power-saving mode is described as one example, but not limited thereto. Any other operation of the apparatus may be affected by the transition or shift to the power-saving mode.

Figure 3:
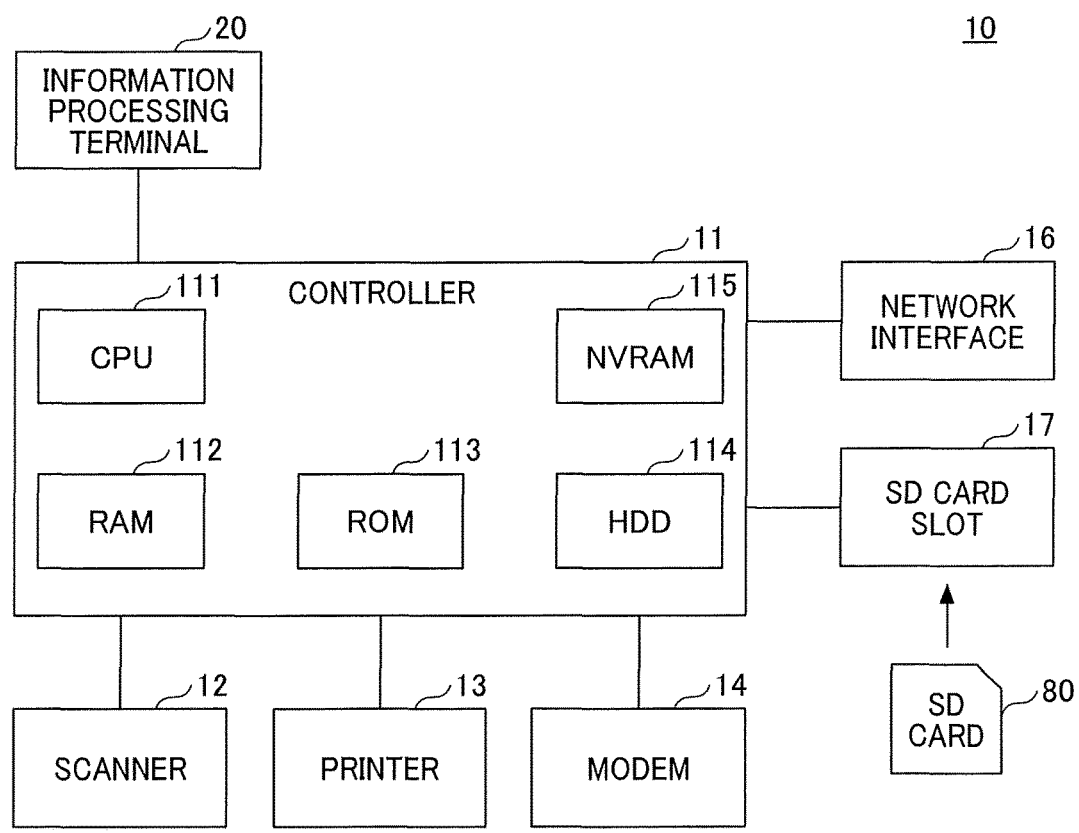
FIG. 3 illustrates an example of a hardware block diagram of an image forming apparatus according to an embodiment.

Hereinafter, a description is given of an embodiment of this disclosure with reference to the accompanying drawings. FIG. 3 illustrates an example of a hardware block diagram of an image forming apparatus 10 according to the embodiment. As illustrated in FIG. 3. the image forming apparatus 10 includes hardware resources, such as a controller 11, a scanner 12, a printer 13, a modem 14, a network interface 16, and a secure digital (SD) card slot 17.

The controller 11 serves as a computer in a main unit of the image forming apparatus 10. As illustrated in FIG. 3, the controller 11 includes, for example, a central processing unit (CPU) 111, a random access memory (RAM) 112, a read only memory (ROM) 113, a hard disc drive (HDD) 114, and a non-volatile random access memory (NVRAM) 115. The ROM 113 stores various programs and data used by the programs. The RAM 112 is used as a memory area to which a program is loaded and used as a work area for executing a loaded program. The CPU 111 executes a program loaded to the RAM 112 to implement various functions. The HDD 114 stores programs and various data used by the programs. The NVRAM 115 stores various setting information.

The scanner 12 is hardware (image reading device) that scans a document to obtain image data. The printer 13 is hardware (printing device) that forms an image on a sheet in accordance with print data. The modem 14 is hardware for connecting to a telephone line, which is used for transmitting and receiving image data by facsimile communication. The network interface 16 is hardware to connect the image forming apparatus 10 to a wired or wireless network, such as a local area network (LAN). The SD card slot 17 is used for reading programs stored in a SD card 80. Accordingly, in the image forming apparatus 10, not only the programs stored in the ROM 113 but also the programs stored in the SD card 80 may be loaded to the RAM 112 for execution. In addition or in alternative to the SD card 80, any other suitable storage medium may be used, such as a compact disk read only memory (CD-ROM) or a universal serial bus (USB) memory. In other words, the type of storage medium corresponding to the SD card 80 is not limited to a specific type. In this case, any other suitable hardware is used in alternative to the SD card slot 17 depending on a type of storage medium.

The controller 11 is connected to an information processing terminal 20. Examples of the information processing terminal 20 employs, for example, a smartphone and a tablet terminal. The smartphone is a terminal device that has multiple functions, such as a calling function of mobile phone, an imaging function implemented by a camera, and a function of displaying web information like a PC. The tablet terminal serves as a multifunction terminal in the same way as the smartphone.

In the embodiment, the information processing terminal 20 serves as an operation unit of the image forming apparatus 10. More specifically, the information processing terminal 20 is connected to the controller 11 in place of a control panel conventionally mounted as an operation unit dedicated to the image forming apparatus 10. The controller 11 and the information processing terminal 20 are connected via, for example, a USB cable, short-distance wireless communication, or a communication line such as a LAN.

Figure 4:
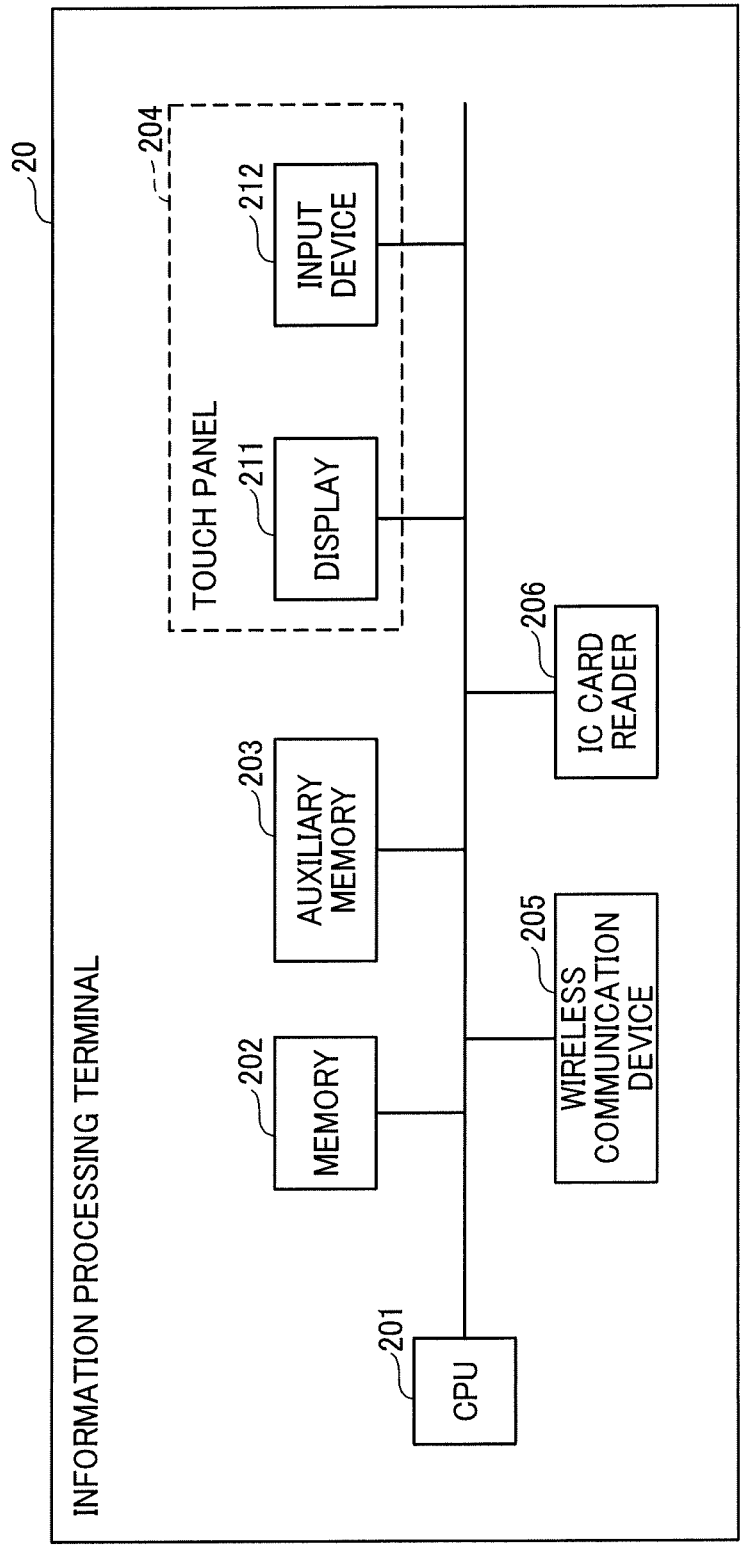
FIG. 4 illustrates an example of a hardware block diagram of an information processing terminal according to the embodiment.

FIG. 4 illustrates a hardware block diagram of the information processing terminal 20 according to the embodiment. As illustrated in FIG. 4, the information processing terminal 20 includes, for example, a CPU 201, a memory 202, an auxiliary memory 203, a touch panel 204, a wireless communication device 205, and an integrated circuit (IC) card reader 206.

The auxiliary memory 203 stores programs and the like installed in the information processing terminal 20. In response to an instruction to activate a program, the memory 202 reads the program from the auxiliary memory 203 and stores the read program. The CPU 201 executes functions designed for the information processing terminal 20 according to the program stored in the memory 202.

The touch panel 204 is an electronic component having both an input function and a display function, and displays information and receives an user input. The touch panel 204 includes, for example, a display 211 and an input device 212.

The display 211 is a liquid crystal display (LCD) or the like, and implements the display function of the touch panel 204. The input device 212 is an electronic component that includes a sensor to detect an object (contact object) touching the display 211. The method of detecting the contact object may be any one of known methods such as an electrostatic method, a resistive film method, an optical method, and the like. Hereinafter, the contact object is defined as an object that touches a contact surface (surface) of the touch panel 204. The object is, for example a finger of a user, a dedicated or general pen, or the like.

The wireless communication device 205 is an electronic component such as an antenna required for establishing communication in a wireless LAN or a mobile communication network. However, in the embodiment, the information processing terminal 20 can omit the wireless communication device 205.

The IC card reader 206 reads card identification information (ID) stored in the IC card (card ID is an example of ID identifying the card). For example, each user may be provided with an IC card storing a card ID that is unique to the card, and each user may be authenticated based on the corresponding card ID.

Figure 5:
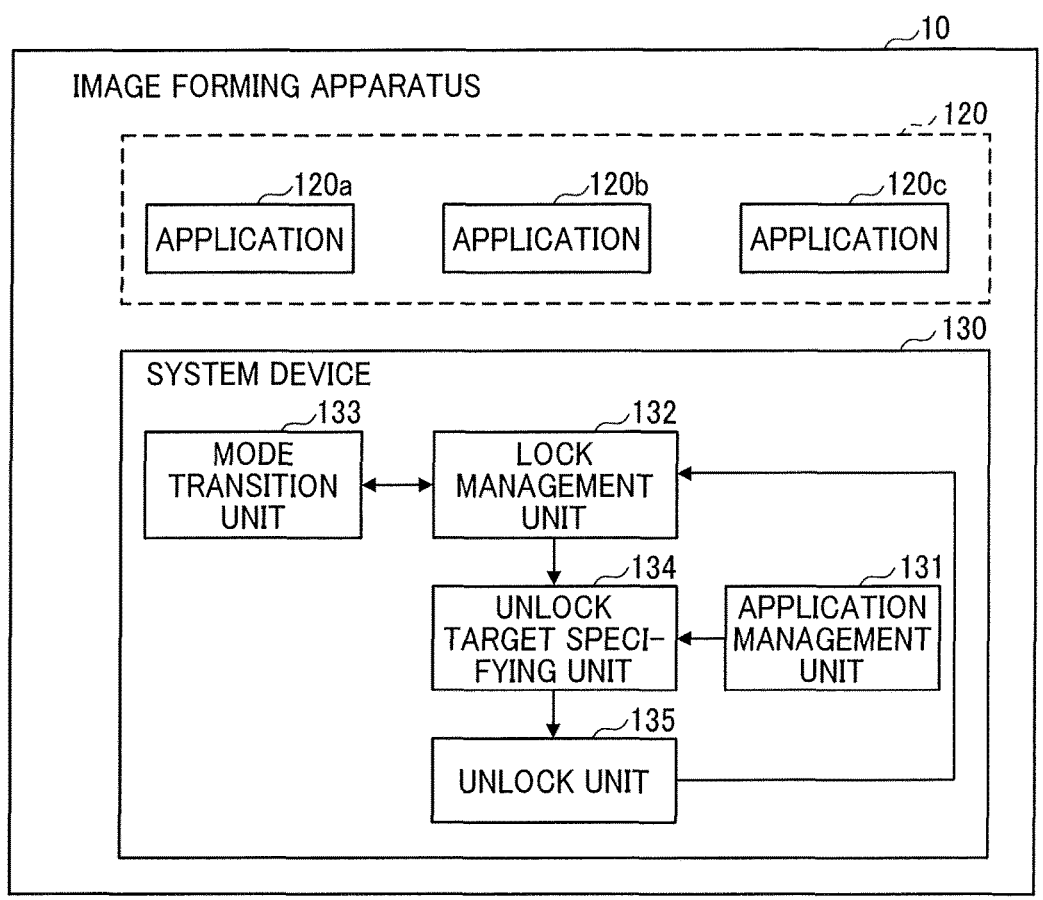
FIG. 5 illustrates an example of a functional block diagram of the image forming apparatus according to the embodiment.

FIG. 5 illustrates an example of a functional block diagram of the image forming apparatus 10 according to the embodiment. As illustrated in FIG. 5, the image forming apparatus 10 includes one or more applications 120 (e.g., applications 120a, 120b, 120c), and a system device 130. Each of the above-mentioned functional units is implemented by executing one or more programs installed in the information processing terminal 20 or the controller 11 by the CPU 201 or the CPU 111.

The application 120 is an application program that provides a user a service using the image forming apparatus 10. In the embodiment, the application 120 is used as a source of requesting a lock mode and canceling the lock mode (unlocking) for various operations of the image forming apparatus 10.

The system device 130 provides each application 120 with a common function to be used by the plurality of applications 120 (e.g., applications 120a, 120b, 120c). As illustrated in FIG. 5, the system device 130 includes, for example, an application management unit 131, a lock management unit 132, a mode transition unit 133, an unlock target specifying unit 134, and an unlock unit 135.

The application management unit 131 manages a life cycle of the application 120. For example, the application management unit 131 installs, uninstalls, starts (activates), and terminates (deactivates) the application 120.

In response to a request from the application 120, the lock management unit 132 applies the lock mode to an operation of the image forming apparatus 10 (i.e., mode transition or shift), and unlocks the lock mode. For example, power mode transition, offline transition, power-off of operation unit, display-off of operation unit, system reset, display mode transition of operation unit, logout and the like may be applied with the lock mode.

The power mode transition is defined as an operation of transitioning to a power-saving mode. For example, the image forming apparatus 10 transitions to the power-saving mode at a given time, such as when a certain time elapses while the image forming apparatus 10 is not being operated. The application 120 requests the lock management unit 132 to disenable the power mode transition (lock the transition of power mode) to prohibit the transition of the image forming apparatus 10 to the power-saving mode. Further, the application 120 requests the lock management unit 132 to unlock the locking of power mode transition (enable the power mode transition) to cancel the prohibition of the transition to the power-saving mode of the image forming apparatus 10.

The offline transition is defined as an operation of transitioning to an offline mode. The offline mode is defined as a mode in which values of setting items of the image forming apparatus 10 are changed (that is, a mode in which setting operation is performed on the image forming apparatus 10). In the offline mode, various timers stop, and transition to the power-saving mode, automatic switching of the application 120 or switching of the application 120 in accordance with a user operation is prohibited. The application 120 requests the lock management unit 132 to lock the offline transition to prohibit the image forming apparatus 10 from transitioning to the power-saving mode. Further, the application 120 requests the lock management unit 132 to unlock the locking of the offline transition to cancel the prohibition of the transition to the offline mode of the image forming apparatus 10.

The power-off of operation unit is defined as an operation of stopping power supply to the operation unit (information processing terminal 20). The application 120 requests the lock management unit 132 to lock the power-off of operation unit to prohibits the power-off of the information processing terminal 20. The application 120 requests the lock management unit 132 to unlock the locking of the power-off of operation unit to cancel the prohibition of the power-off of the information processing terminal 20.

The display-off of operation unit is defined as an operation of stopping displaying on the display 211 of the operation unit (information processing terminal 20). The application 120 requests the lock management unit 132 to lock the display-off of operation unit to prohibit the displaying on the display 211. Further, the application 120 requests the lock management unit 132 to unlock the locking of the display-off of operation unit to cancel the prohibition of the displaying on the display 211.

The system reset is defined as an operation of automatically switching a display screen of the information processing terminal 20 to an initial screen, and resetting setting values to initial values when a user operation is not being performed for a certain period of time. In resetting the setting values, the setting values that were input via a screen being displayed right before the switching, are reset to the initial values. The application 120 requests the lock management unit 132 to lock the system reset to prohibit the system reset. Further, the application 120 requests the lock management unit 132 to unlock the locking of the system reset to cancel the prohibition of the system reset.

The display mode transition of operation unit is defined as an operation of changing a display mode of the operation unit (information processing terminal 20). The display mode includes, for example, three modes such as a display stop mode, a display mode, and a sleep mode. The application 120 requests the lock management unit 132 to lock the display mode transition of operation unit to prohibit the display mode transition of operation unit. In addition, the application 120 requests the lock management unit 132 to unlock the locking of the display mode transition of operation unit to cancel the prohibition of the display mode transition of operation unit.

The logout is defined as an operation of logging out of a login user. The application 120 requests the lock management unit 132 to lock the logout to prohibit the logout under a condition where the logout may cause a trouble, for example, when the image forming apparatus 10 is performing a job. Further, the application 120 requests the lock management unit 132 to unlock the locking of the logout to cancel the prohibition of the logout.

The locking of each of the above described operation may be requested by each application 120. When an operation is locked by any one of the applications 120, the operation is prohibited. That is, if an operation is locked by the plurality of applications 120, the operation is prohibited until the locking by all of the plurality of applications 120 is unlocked.

The mode transition unit 133 controls an operation not applied with the lock mode (i.e., controls the mode transition), for the above-described operations applicable with the lock mode. The mode transition unit 133 controls the mode transition.

The unlock target specifying unit 134 checks whether each application 120 is being executed (active) at a plurality of time points to specify one or more applications 120 that has been terminated while keeping the lock mode and that is not expected to resume.

The unlock unit 135 forcibly cancels (unlocks) the lock mode applied by the application 120 specified by the unlock target specifying unit 134.

Figure 6:
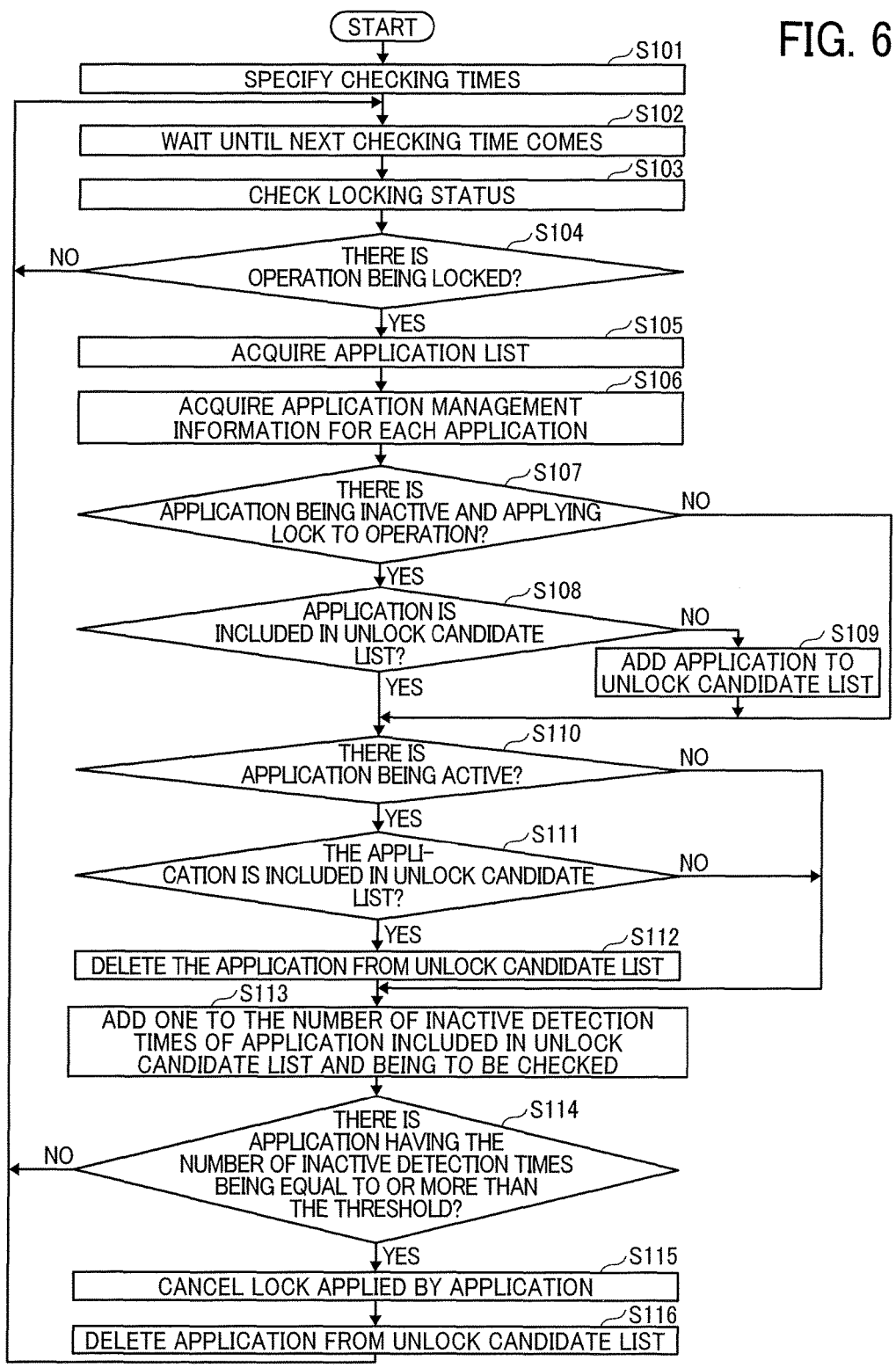
FIG. 6 is a flowchart illustrating an example process performed by the image forming apparatus according to the embodiment.

Hereinafter, a description is given of a process performed by the image forming apparatus 10. FIG. 6 is a flowchart illustrating an example process performed by the image forming apparatus 10 according to the embodiment.

In S101, the unlock target specifying unit 134 specifies a checking time. The checking time is defined as a timing to perform the sequence of S102 to S116 repeatedly. The checking time is specified according to a check interval that is set in advance. For example, when the check interval is set to thirty seconds, the checking time comes after thirty seconds from a current time. The check interval may be common to all the applications 120 or may be set differently for each of the applications 120. When the check interval is settable for each application 120, for example, the check interval of the application 120 may be acquired from configuration information included in an installation package (archive file) of the application 120 at the time of installing the application 120. Alternatively, the check interval may be acquired from the configuration information of the application 120 when the application 120 is activated for the first time.

FIG. 7 illustrates an example of configuration information of the application 120. In the example of FIG. 7, the configuration information of the application 120 is defined in an extensible markup language (XML) format, but the format of the configuration information is not limited thereto. In FIG. 7, a description d1 indicates identification information (hereinafter, referred to as "application identifier") of the application 120. A description d2 indicates that the check interval of the application 120 is thirty seconds.

For the application 120 whose configuration information is not acquirable, a pre-set value (default value) may be used as the check interval. The pre-set value may be changeable by a user operation or a remote operation performed via a network. Further, the pre-set value may be changed by using an IC card or the like.

When the check intervals of the applications 120 differs from each other, the unlock target specifying unit 134 may use logical addition of the checking times based on the check intervals of the applications 120 to set a checking time for the future checking. For example, when the check interval of the application 120a is two minutes and the check interval of the application 120b is five minutes, the checking times are set at, from a current time, two minutes later, four minutes later, five minutes later, six minutes later, eight minutes later, ten minutes later, . . . , and so on. In the above-described case, the checking time at two minutes later, four minutes later, six minutes later, and eight minutes later from the current time are set for the application 120a. The checking time at five minutes later from the current time is set for the check timing for the application 120b. The checking time at ten minutes later from the current time is the check timing set for both the application 120a and the application 120b.

Subsequently, the unlock target specifying unit 134 waits until a next checking time comes (S102). It should be noted that when S102 is performed for the first time, the next checking time is the first checking time. When the next checking time comes, the unlock target specifying unit 134 acquires from the lock management unit 132 information indicating a current locking status of the entire system (hereinafter, referred to as locking status information) (S103).

FIG. 8 illustrates examples of the locking status information. FIG. 8(1) illustrates a first example of the locking status information, and FIG. 8(2) illustrates a second example of the locking status information.

The locking status information includes a value indicating a current status (whether each operation is locked or not, that is, prohibited or not prohibited), for each operation, to which the lock mode (prohibition) is applicable, of the image forming apparatus 10 of the embodiment. The value indicating the current status is LOCKED or UNLOCKED. LOCKED is defined as a locked mode (a mode in which the corresponding operation is locked and prohibited). UNLOCKED is defined as an unlocked mode (mode in which the prohibition of the corresponding operation is unlocked (canceled)). In the example of FIG. 8(1), the power mode transition and logout are locked. In other words, the transition of the power mode (e.g., transition from the standby mode to the power-saving mode) is prohibited, and changing a login status of a currently logged-in user manually or automatically to a logout status is prohibited.

In the example of FIG. 8(2), an application identifier (e.g., "xxxxxxxxxxxxxxxxx2") of the application 120 that is a lock request source is associated with the operation having a lock status of LOCKED.

The lock status of each operation is set LOCKED when the lock is requested from at least one of the applications 120, and the lock status of each operation is set UNLOCKED when the operation is not locked by any of the applications 120.

Then, the unlock target specifying unit 134 determines whether one or more operations are locked (having the lock status of LOCKED) by checking the locking status information (S104). When no operation is locked (S104: NO), the unlock target specifying unit 134 returns to S102 to wait until the next checking time, and then performs the sequence from S103 again.

When one or more operations are locked (S104: YES), the unlock target specifying unit 134 acquires list information of the applications 120 (hereinafter, an application list), which are installed in the image forming apparatus 10, from the application management unit 131 (S105).

FIG. 9 illustrates an example of the application list. As illustrated in FIG. 9, the application list includes, for example, an application identifier and an operational status of each application 120 installed in the image forming apparatus 10.

The application identifier is identification information identifying the corresponding application 120 as described above. As long as a value of the application identifier identifies the corresponding application 120, any application identifier, such as a data type, a length, a data format, and the like can be used. For example, a Java (registered trademark) package name, such as "jp.co.rrr.xxx.app 1" or a universally unique identifier (UUID), such as "350e6402-a73b-41d2-a716-146625340000" may be used as the application identifier.

The operational status is information indicating whether the application 120 is active (executed/activated) or inactive (terminated/deactivated). Additionally, the operational status can include, for example, being installed, preparing for activation, temporary suspended, being updated, in addition to being active (executed/activated) and inactive (terminated/deactivated).

Then, the unlock target specifying unit 134 acquires, from the lock management unit 132, application management information of each application 120 identified by the corresponding application identifier included in the application list (S106)

FIG. 10 illustrates an example of the application management information. As illustrated in FIG. 10, the application management information includes, for example, an application identifier and information indicating presence or absence of a lock for each operation to which the lock is applicable.

The application identifier is the application identifier of the application 120 corresponding to the application management information. The presence or absence of a lock for each operation is information indicating whether the application 120 applies a lock to each operation or not, and a value is the same as that of the lock mode information of FIG. 8.

Then, the unlock target specifying unit 134 determines whether there are one or more applications 120 having the operational status of inactive and applying the lock mode to at least one operation (S107). The unlock target specifying unit 134 can perform the determination in S107 based on the application list (FIG. 9) and the application management information (FIG. 10). More specifically, the unlock target specifying unit 134 determines whether the operational status of each application is inactive based on the application list (see FIG. 9), and determines any one of the operations is set "LOCKED" for the application 120, which is determined as being inactive, based on the application management information (see FIG. 10). In the example case of FIG. 9, the application list indicates that three applications 120 are installed, in which the application 120 identified by the application identifier of "xxxxxxxxxxxxxxxxx2" is inactive. Additionally, the application 120 identified by the application identifier of "xxxxxxxxxxxxxxxxx3" is also inactive. Further, in the example case of the application management information of FIG. 10, the application 120 identified by the application identifier of "xxxxxxxxxxxxxxxxx2" applies the lock mode to the power mode transition. Therefore, at least the application 120 identified by the application identifier of "xxxxxxxxxxxxxxxxx2" satisfies with the condition in S107.

When there is no application 120 that satisfies with the above-mentioned condition (S107: NO), the sequence proceeds to S110. When there are one or more applications 120 that satisfy the above-mentioned condition (S107: YES), the unlock target specifying unit 134 determines whether the one or more applications 120 have already included in an unlock candidate list as unlock candidates (S108). The unlock candidate list is defined as data having a list structure for storing an application identifier and the number of inactive detection times of the application 120, which is inactive while keeping one or more operations locked. The unlock candidate list is vacant when the sequence of FIG. 6 is performed for the first time.

If the application identifier of the application 120 is already stored in the unlock candidate list (S108: YES), the sequence proceeds to S110. On the other hand, if the application identifier of the application 120 is not included in the unlock candidate list (S108: NO), the unlock target specifying unit 134 adds the application identifier and the number of inactive detection times of the application 120 to the unlock candidate list (S109), and then the sequence proceeds to S110. When the application 120 is added to the unlock candidate list (S109), the number of inactive detection times is initialized to zero (0).

FIG. 11 illustrates an example of the unlock candidate list. As illustrated in FIG. 11, the unlock candidate list includes, for example, the application identifier and the number of inactive detection times for each application 120 set as the unlock candidate. The number of inactive detection times is the number of times continuously detecting that the application 120 is being in the inactive status when checking the application 120 while the application 120 is keeping the lock mode for one or more operations. Additionally, as long as a value of the number of inactive detection times can be counted, any application identifier, such as a data type, a length, a data format, and the like can be used. In the example case of FIG. 11, in addition to the application 120 identified by the application identifier of "xxxxxxxxxxxxxxxxx2," the application 120 identified by an identifier of "xxxxxxxxxxxxxxxxx3" is also indicated as the unlock candidate. That is, the application 120 identified by the application identifier of "xxxxxxxxxxxxxxxxx2" and the application 120 identified by the identifier of "xxxxxxxxxxxxxxxxx3" are both inactive while keeping one or more operations locked.

In S110, the unlock target specifying unit 134 determines whether there are one or more of the applications 120 being active based on the application list illustrated in FIG. 9. When there is no application 120 being active (S110: NO), the sequence proceeds to S113. When there are one or more of the applications 120 being active (S110: YES), the unlock target specifying unit 134 determines whether the application identifier of the application 120 is included in the unlock candidate list illustrated in FIG. 11 (S111). When the application identifier of the application 120 is not included in the unlock candidate list (S111: NO), the sequence proceeds to S113. If the application identifier of the application 120 is included in the unlock candidate list (S111: YES), the unlock target specifying unit 134 deletes the application identifier of the application 120 and the number of inactive detection times from the application candidate list (S112), and the sequence proceeds to S113. The application 120 is the concerned application that was previously detected as being inactive while keeping one or more operations locked, and then resumed before the number of inactive detection times becomes equal to a threshold or more, which is to be described later, and the application 120 is excluded from the unlock candidates as described above.

In S113, the unlock target specifying unit 134 adds one to the number of inactive detection times of the application 120 to be checked at a current checking time among the applications 120 included in the unlock candidate list (FIG. 11). The application 120 to be checked at the current checking time is an application having a checking time that equals to the current checking time based on the check interval of the application 120.

Then, the unlock target specifying unit 134 refers to the unlock candidate list (FIG. 11) to determine whether there are one or more applications 120 that have the number of inactive detection times being equal to the threshold or more (S114). That is, the unlock target specifying unit 134 determines whether the number of inactive detection times of the application 120, continuously detected for the application 120 keeping one or more operations at the lock mode, equals to the threshold or more. The threshold may be a value that is common to all the applications 120. Alternatively, the threshold may be a value that is set for each of the applications 120 differently. Alternatively, the threshold may be a value that is appropriately changed according to the operation.

When no application 120 satisfies the above-mentioned condition (S114: NO), the sequence returns to S102 to wait until the next checking time, and then performs the sequence from S103 again. When one or more applications 120 satisfy the above-mentioned condition (S114: YES), the unlock unit 135 unlocks all of the locked status that are applied by the application 120 (hereinafter, the application 120 may be referred to as a target application 120) (S115). That is, all of the locked status set for the operations in the application management information (FIG. 10) of the target application 120 are changed to UNLOCKED. In response to the cancelling of the lock status, the lock management unit 132 also updates the locking status information illustrated in FIG. 8 as necessary. That is, in a case where there is no application 120 applying the locked status to the operations in accordance with the cancelling of the locked status, all of the lock status of the operations are updated to "UNLOCKED" in the lock mode information illustrated in FIG. 8.

Then, the unlock unit 135 deletes the application identifier and the number of inactive detection times of the target application 120 from the unlock candidate list (S116). Then, the unlock target specifying unit 134 returns to S102 to wait until the next checking time, and then performs the sequence from S103 again.

Figure 12:
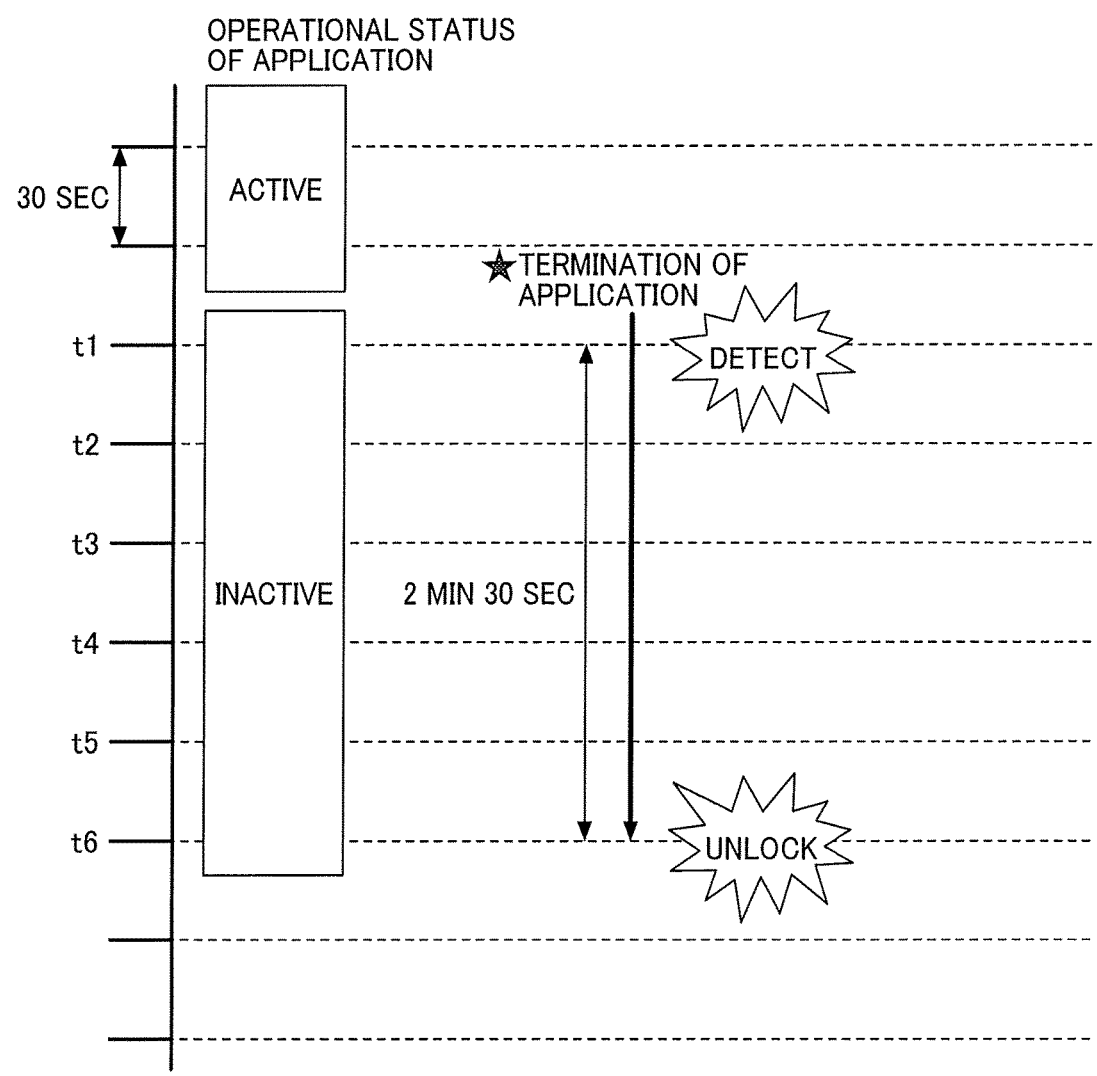
FIG. 12 illustrates an example case where a lock mode applied by application is forcibly canceled according to the embodiment.

The lock status is forcibly canceled in a case illustrated in FIG. 12 using the sequence of FIG. 6. FIG. 12 illustrates an example case where a lock is forcibly canceled according to the embodiment.

In FIG. 12, the termination of the application 120 is detected at a checking time point t1. If the threshold of "six" is used in S114, the lock status applied by the application 120 is forcibly canceled (unlocked) at a checking time point t6. That is, when a check interval of the application 120 is thirty seconds, the lock status applied by the application 120 is canceled when the application 120 is determined to be inactive for a period of two minutes and thirty seconds.

As to the above described embodiment, the lock status applied by the application 120 and detected at one checking time point is not a target to be forcibly canceled, but the lock status applied by the application 120 and continuously detected for a plurality of time points is a target to be forcibly canceled. In other words, if the inactive status of the application 120 is being detected continuously at the plurality of time points during a given period of time, the inactive status of the application 120 is a target to be forcibly canceled. Therefore, the lock status applied by the application 120 that is detected for the termination at one checking time point and then resumed by the resuming process is excluded from the unlock target. As a result, the above described information processing apparatus 10 can reduce occurring of unexpected operation of the program (application 120), which is not convenient for the program, in the information processing apparatus 10.

Furthermore, in the embodiment, the check interval can be set for each application 120 differently. Accordingly, in consideration of the time required for the resuming process of each application 120, the expected tine of resuming of each application 120 is appropriately determined. For example, the example of FIG. 12 is suitable for a case when the resuming process of the application 120 takes about two minutes. If the application 120 is not reactivated when two minutes elapses from the detection of the termination, the application 120 is highly expected to fail to perform the resuming process, and the lock status applied by the application 120 is being continued.

In the description of the embodiment, as an example of the image forming apparatus 10, a multifunction peripheral having a copy function, a facsimile function, and a printer function is used. However, the embodiment is not limited to the above, and a single device having one of the above-mentioned functions, such as a copier, a facsimile, a printer, or a scanner, also may be used as the image forming apparatus 10. Moreover, the embodiment may be applied to an apparatus other than the image forming apparatus 10 and an information processing apparatus. For example, the embodiment may be applied to a projector, an electronic whiteboard, a video conference system, a general-purpose computer, or the like. In a case of a projector, the scanner 12 and the printer 13 in the hardware configuration of FIG. 3 are not necessary. In the case of a projector, a projecting device is provided in place of the scanner 12 and the printer 13. As described above, the embodiment may be applied to each apparatus and each information processing apparatus by replacing the functions according to the corresponding characteristics of each apparatus and each information processing apparatus.

In the above embodiment, the image forming apparatus 10 is an example of an information processing apparatus. The unlock target specifying unit 134 is an example of a check unit. The unlock unit 135 is an example of a cancel unit. The threshold corresponding to the number of inactive detection times is an example of the number of pre-set times.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Although the embodiments of the disclosure have been described and illustrated above, such description is not intended to limit the disclosure to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An information processing apparatus, comprising:
   circuitry configured to:
   check at a plurality of time points during a given period of time whether a program is included in an unlock candidate list and currently in an active status while keeping prohibition of an operation of the information processing apparatus, wherein the unlock candidate list is a list of programs that are in an inactive status and keeping the prohibition of the operation;
   cancel the prohibition of the operation of the information processing apparatus when the program is being in the inactive status for the given period of time; and
   keep the prohibition of the operation of the information processing apparatus when the program is ever returned to the active status during the given period of time.

2. The information processing apparatus of claim 1, wherein the circuitry is further configured to cancel the prohibition when the program is being continuously detected in the inactive status for a given number of times in checking the program at the plurality of time points.

3. The information processing apparatus of claim 2, wherein, when an execution of the program is detected before detecting that the program is being continuously detected in the inactive status for the given period of time, the circuitry is further configured to keep the prohibition.

4. The information processing apparatus of claim 1, wherein the program includes a plurality of programs and when the plurality of programs is being in the inactive status while keeping the prohibition of the operation of the information processing apparatus, the circuitry is further configured to check whether each one of the plurality of programs is in the active status at the plurality of time points, which are set for each one of the plurality of programs differently.

5. The information processing apparatus of claim 1, wherein the operation includes a transition to an energy saving mode.

6. A method for canceling prohibition, the method comprising:
checking at a plurality of time points during a given period of time whether a program is included in an unlock candidate list and currently in an active status while keeping prohibition of an operation of an information processing apparatus, wherein the unlock candidate list is a list of programs that are in an inactive status and keeping the prohibition of the operation;
canceling the prohibition of the operation of the information processing apparatus when the program is being in the inactive status for the given period of time; and
keeping the prohibition of the operation of the information processing apparatus when the program is ever returned to the active status during the given period of time.

7. The method of claim 6, further comprising:
canceling the prohibition when the program is being continuously detected in the inactive status for a given number of times when checking the program at the plurality of time points.

8. The method of claim 6, further comprising:
keeping the prohibition when an execution of the program is detected before detecting that the program is being continuously detected in the inactive status for the given period of time.

9. The method of claim 6, wherein the program includes a plurality of programs and when the plurality of programs is being in the inactive status while keeping the prohibition of the operation of the information processing apparatus, further comprising:
checking whether each one of the plurality of programs is in the active status at the plurality of time points, which are set for each one of the plurality of programs differently.

10. The method of claim 6, wherein the operation includes a transition to an energy saving mode.

11. A non-transitory recording medium storing a plurality of instructions which, when executed by one or more processors, cause the processors to perform a method, comprising:
checking at a plurality of time points during a given period of time whether a program is included in an unlock candidate list and currently in an active status while keeping prohibition of an operation of an information processing apparatus, wherein the unlock candidate list is a list of programs that are in an inactive status and keeping the prohibition of the operation;
canceling the prohibition of the operation of the information processing apparatus when the program is being in the inactive status for the given period of time; and
keeping the prohibition of the operation of the information processing apparatus when the program is ever returned to the active status during the given period of time.

12. The non-transitory recording medium of claim 11, the method further comprising:
canceling the prohibition when the program is being continuously detected in the inactive status for a given number of times when checking the program at the plurality of time points.

13. The non-transitory recording medium of claim 11, the method further comprising:
keeping the prohibition when an execution of the program is detected before detecting that the program is being continuously detected in the inactive status for the given period of time.

14. The non-transitory recording medium of claim 11, wherein the program includes a plurality of programs and when the plurality of programs is being in the inactive status while keeping the prohibition of the operation of the information processing apparatus, the method further comprising:
checking whether each one of the plurality of programs is in the active status at the plurality of time points, which are set for each one of the plurality of programs differently.

15. The non-transitory recording medium of claim 11, wherein the operation includes a transition to an energy saving mode.

* * * * *